United States Patent
Wu et al.

(10) Patent No.: US 9,283,977 B2
(45) Date of Patent: Mar. 15, 2016

(54) FOLDABLE JOGGING STROLLER FRAME WITH AN AUTO-SWIVELING MECHANISM FOR REAR WHEEL SETS THEREOF

(71) Applicant: LERADO (ZHONG SHAN) INDUSTRIAL CO., LTD., Zhong Shan, Guang Dong (CN)

(72) Inventors: Tse-Chien Wu, Kaohsiung (TW); Yung-Shuen Lin, Taibao (TW); Shan-Heng Lin, Chiayi County (TW)

(73) Assignee: Dorel Juvenile (Zhongshan) Product Co., Ltd., Guang Dong (CN)

( * ) Notice: Subject to any disclaimer, the term of this patent is extended or adjusted under 35 U.S.C. 154(b) by 0 days.

(21) Appl. No.: 14/514,949

(22) Filed: Oct. 15, 2014

(65) Prior Publication Data
US 2015/0102587 A1    Apr. 16, 2015

(30) Foreign Application Priority Data
Oct. 16, 2013   (CN) ........................ 2013 2 0638209 U

(51) Int. Cl.
B62B 7/08   (2006.01)
B62B 7/00   (2006.01)
B62B 7/04   (2006.01)
B62B 7/06   (2006.01)

(52) U.S. Cl.
CPC . B62B 7/006 (2013.01); B62B 7/08 (2013.01); B62B 7/044 (2013.01); B62B 7/064 (2013.01); B62B 7/086 (2013.01); B62B 2205/12 (2013.01)

(58) Field of Classification Search
CPC .................... B62B 7/044; B62B 7/06–7/105
See application file for complete search history.

(56) References Cited

U.S. PATENT DOCUMENTS

| | | | | |
|---|---|---|---|---|
| 5,863,061 A | * | 1/1999 | Ziegler et al. | 280/642 |
| 8,439,391 B1 | * | 5/2013 | Liu | 280/650 |
| 2003/0057681 A1 | * | 3/2003 | Lan | 280/642 |
| 2003/0164606 A1 | * | 9/2003 | Chen | 280/642 |
| 2005/0012306 A1 | * | 1/2005 | Lan | 280/647 |
| 2006/0175803 A1 | * | 8/2006 | Santoski | 280/642 |
| 2006/0192366 A1 | * | 8/2006 | Kimberley | 280/651 |
| 2007/0246916 A1 | * | 10/2007 | Hou | 280/642 |
| 2009/0058026 A1 | * | 3/2009 | Park et al. | 280/38 |
| 2009/0115151 A1 | * | 5/2009 | Van Dijk | 280/47.38 |
| 2009/0121455 A1 | * | 5/2009 | Kretschmer et al. | 280/642 |
| 2010/0219616 A1 | * | 9/2010 | Dotsey | 280/642 |
| 2013/0093165 A1 | * | 4/2013 | Liao | 280/651 |
| 2013/0156490 A1 | * | 6/2013 | Schroeder | 403/104 |
| 2013/0257019 A1 | * | 10/2013 | Eisinger | 280/650 |
| 2014/0015209 A1 | * | 1/2014 | Fleming et al. | 280/32.7 |
| 2015/0076775 A1 | * | 3/2015 | Wu et al. | 280/38 |
| 2015/0076776 A1 | * | 3/2015 | Wu et al. | 280/38 |
| 2015/0102587 A1 | * | 4/2015 | Wu et al. | 280/642 |

* cited by examiner

*Primary Examiner* — Jeffrey J Restifo
*Assistant Examiner* — Erez Gurari
(74) *Attorney, Agent, or Firm* — Muncy, Geissler, Olds & Lowe, P.C.

(57) ABSTRACT

A foldable jogging stroller frame with an auto-swiveling mechanism for rear wheel sets thereof without return-springs, in which the foldable jogging stroller frame may include a front strut, a pair of push arms pivoted with the front strut by a pair of lockable joints, a pair of rear struts pivoted to the pair of push arms, a seat support rods pivoted between the front strut and the rear struts, and the auto-swiveling mechanism includes at least two sets of swivel sleeve assemblies, a pair of rear sets and a pair of connecting elements. While the pair of push arms is rotating, the association of the connecting elements shall cause the sleeves and the rear sets to swivel in ninety degrees (90°) from the longitudinally traveling direction to a transversally stowing direction thereby achieving a compact configuration for storage.

10 Claims, 6 Drawing Sheets

FOLDABLE JOGGING STROLLER FRAME WITH AN AUTO-SWIVELING MECHANISM FOR REAR WHEEL SETS THEREOF

BACKGROUND OF THE INVENTION

1. Field of the Invention

The present invention relates a jogging stroller frame, especially to a jogging stroller which includes a foldable jogging stroller frame and an auto-swiveling mechanism of rear wheel sets for converting into a compact configuration for small storage and easy shipping.

2. Description of the Related Art

Jogging strollers are one of the baby traffic tools with larger wheels that can be pushed by an adult in fast hiking speed. As the wheels are quite larger the normal stroller wheel, it is difficult in folding the Jogging stroller in to a compact configuration for storage, unless the wheels are pulled off by the user before taking the manipulation of the folding.

For eliminating the inconvenience of using the Jogging strollers, the inventors of the present invention ever tried to design a Jogging stroller with a pair of swiveable real wheels that can swivel in ninety degrees from a longitudinally traveling direction to a transversally stowing direction. However, the swiveable real wheels needed to utilize return-springs to bring them back from the transversally stowing direction. This experimental design was found that it is too complex and difficult in assembling a lot of tiny parts in the manufacturing process.

SUMMARY OF THE INVENTION

For taking another approach to eliminate the aforementioned inconvenience, the present invention provides a foldable jogging stroller frame with an auto-swiveling mechanism for rear wheel sets thereof without return-springs, in which the foldable jogging stroller frame may include a front strut, a pair of push arms pivoted with the front strut by a pair of lockable joints, a pair of rear struts pivoted to the pair of push arms, a seat support rods pivoted between the front strut and the rear struts, and the auto-swiveling mechanism includes at least two sets of swivel sleeve assemblies, a pair of rear sets and a pair of connecting elements.

The two sets of swivel sleeve assemblies according to the present invention are operatively connected to the pair of rear struts, and the pair of rear sets is connected to the swivel sleeve assemblies. The pair of connecting elements is connected between the pair of push arms and the swivel sleeve assemblies.

While the foldable jogging stroller frame can be converted from an erected use configuration to a folded configuration by unlocking the lockable joints and rotating the pair of push arms.

When the lockable joints is unlocked, the pair of push arms shall take the pivot mount as a fulcrum to rotated downward as a labor-saving lever, this shall carry the front strut as well as the seat support rods close to the rear struts. While the pair of push arms is rotating, the association of the connecting elements shall cause the sleeves and the rear sets to swivel in ninety degrees (90°) from the longitudinally traveling direction to a transversally stowing direction thereby achieving a compact configuration for storage.

In the same principle, when the pair of push arms are rotated from the folded configuration upward to the erected use configuration, the swivel sleeve assemblies shall carry the rear sets to swivel ninety degrees (90°) automatically from the transversally stowing direction to the longitudinally traveling direction.

By this way, the pair of push arms can be operated in a labor-saving, and the user can easy to manipulate the folding and unfolding of the foldable jogging stroller frame in a most convenient way. Besides, the structure of the swivel sleeve assemblies can be simplified to include only a few simple elements that would be easy to assembly and cost-down in manufacturing the jogging stroller of the present invention.

BRIEF DESCRIPTION OF THE DRAWINGS

The accompanying drawings, which are included to provide a further understanding of the invention are incorporated in and constitute a part of this specification, illustrate embodiments of the invention and together with the description serve to explain the principles of the invention. In the drawings.

DETAILED DESCRIPTION OF THE PREFERRED EMBODIMENTS

Figure 1:
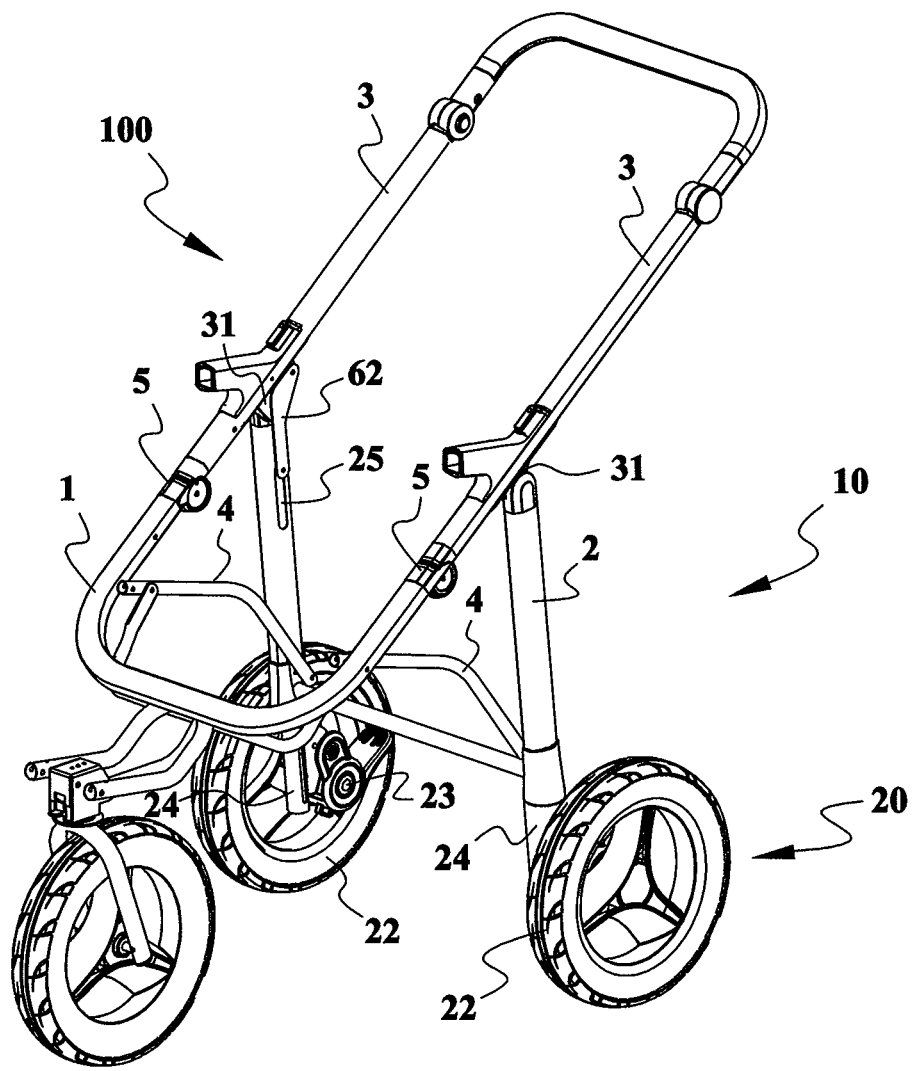
FIG. 1 is a schematic perspective view showing a foldable jogging stroller frame according to the present invention, which has an auto-swiveling mechanism for swiveling the rear wheel sets thereof automatically in folding of the foldable jogging stroller frame.
Figure 2:
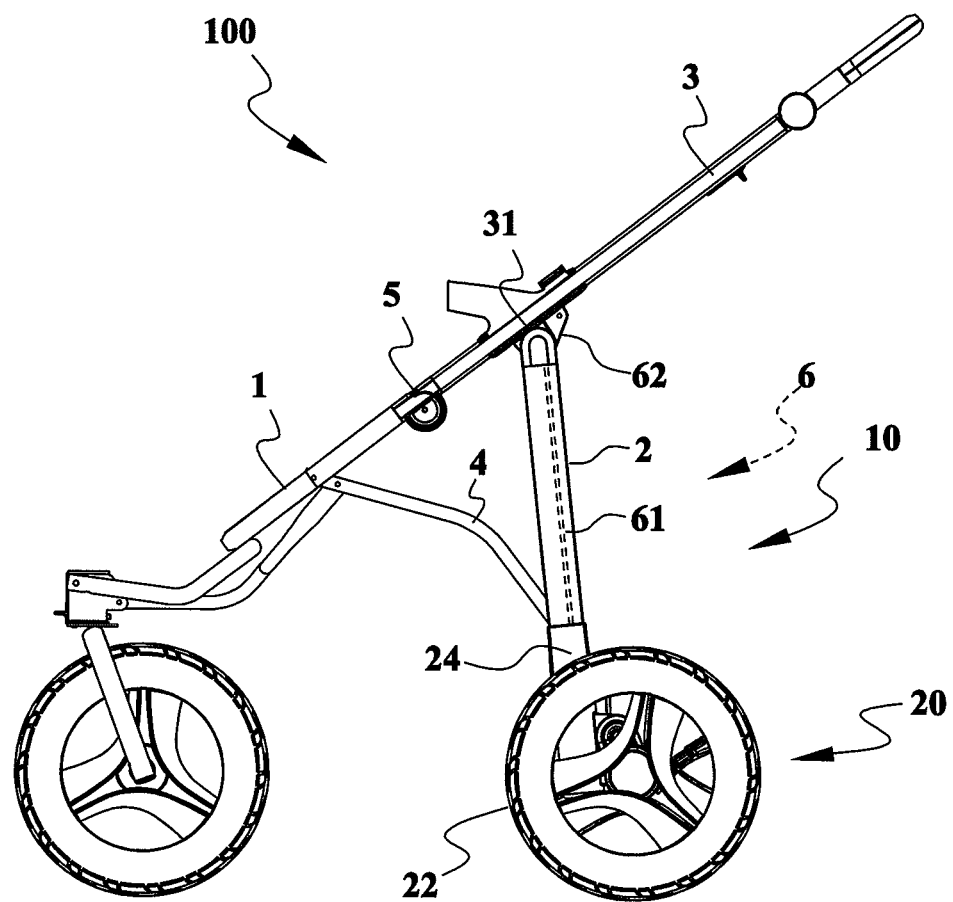
FIG. 2 is a side view of the foldable jogging stroller frame of FIG. 1.

Referring to FIGS. 1 and 2, a foldable jogging stroller frame according to the present invention is equipped with an auto-swiveling mechanism for swiveling the rear wheel sets automatically so as to achieve a more compact configuration in folding operation for storage. The foldable jogging stroller frame 10 may include a front strut 1, a pair of push arms 3 pivoted with the front strut 1 by a pair of lockable joints 5, a pair of rear struts 2 pivoted to the pair of push arms 3, a seat support rods 4 pivoted between the front strut 1 and the rear struts 2.

The auto-swiveling mechanism according to the present invention may include two sets of swivel sleeve assemblies 7, a pair of rear sets 23 and a pair of connecting elements 6.

The two sets of swivel sleeve assemblies 7 are operatively connected to the pair of rear struts 2, the pair of rear sets 23 is connected to the swivel sleeve assemblies 7 and the pair of connecting elements 6 is associated between the pair of push arms 3 and the swivel sleeve assemblies 7.

Figure 4:
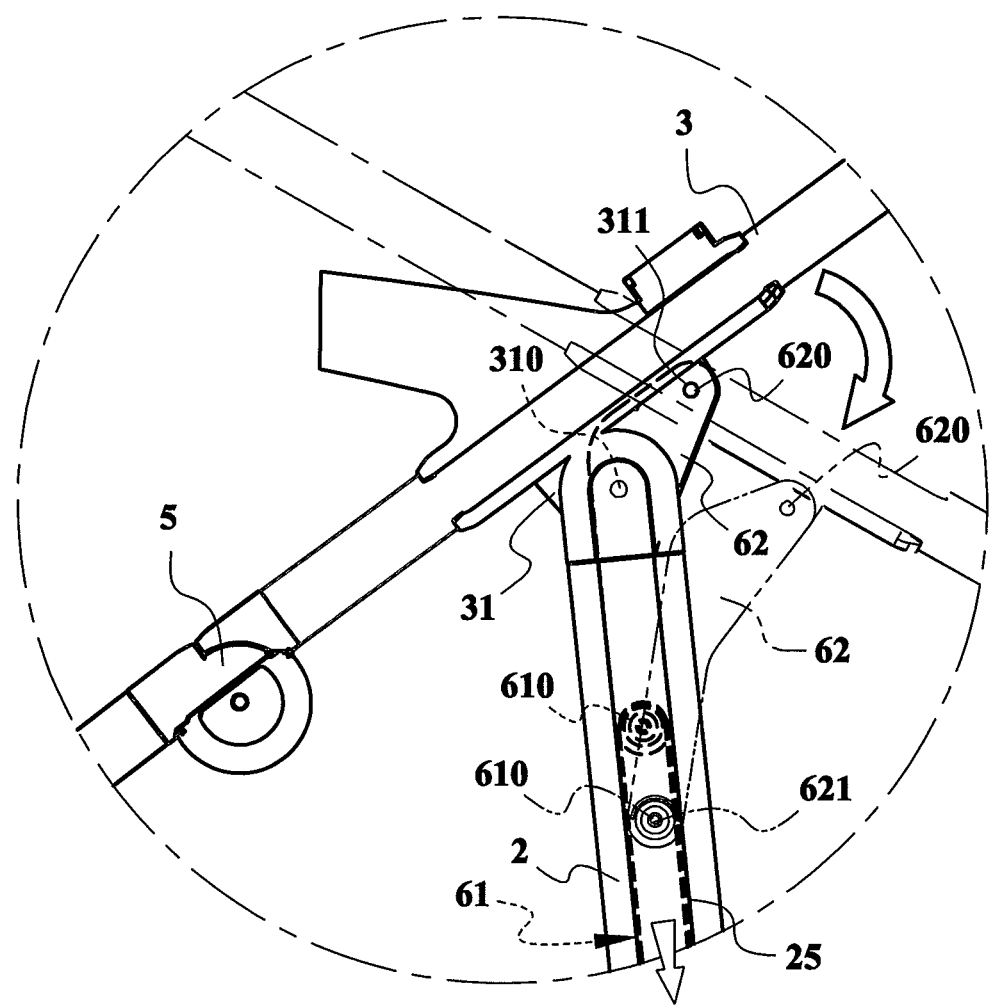
FIG. 4 is a schematic view for illustrating the operation of the auto-swiveling mechanism according to the present invention.
Figure 6:
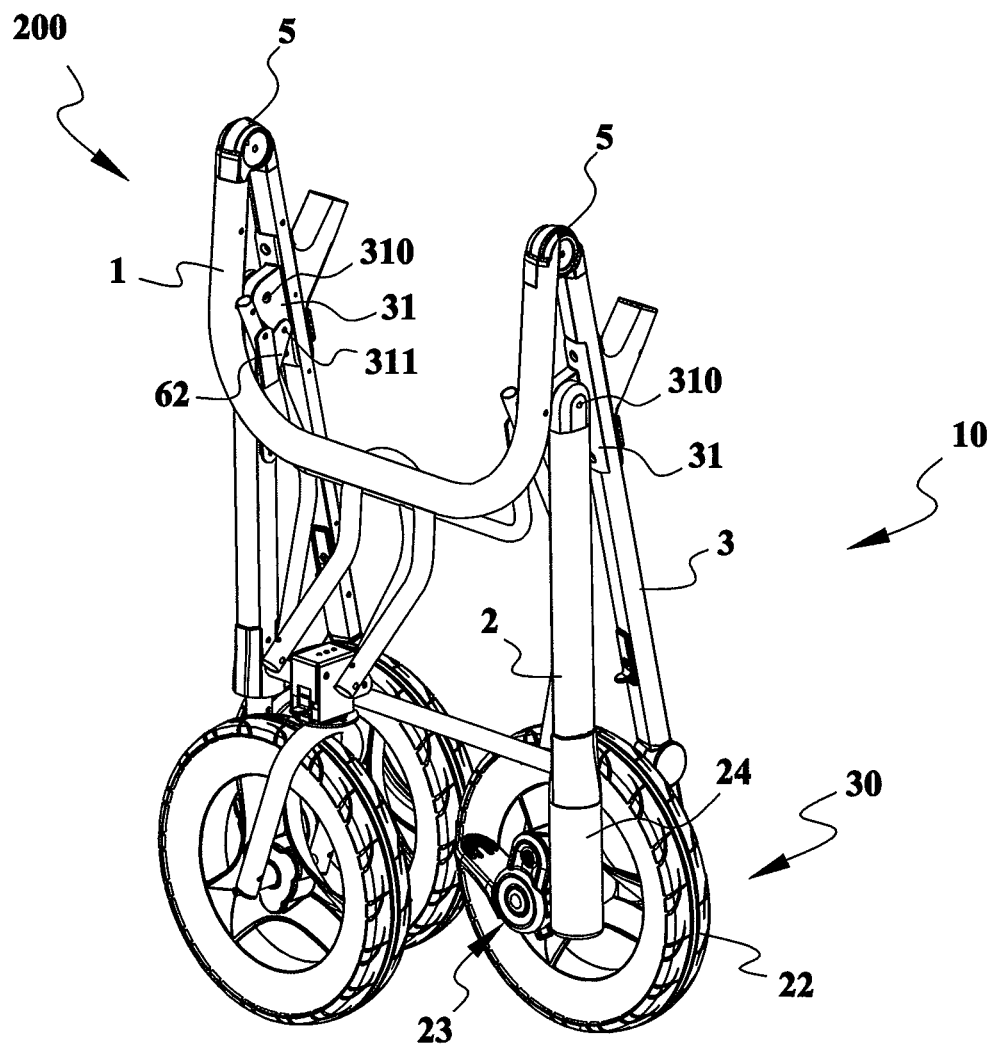
FIG. 6 is a schematic view for illustrating the foldable jogging stroller frame is folded into a compact configuration while the auto-swiveling mechanism has been swiveled the rear wheel sets in ninety degrees from a longitudinally traveling direction to a transversally stowing direction.

As being illustrated in FIGS. 4 and 6, when the lockable joints 5 is unlocked, the pair of push arms 3 can be rotated downward thereby folding the foldable jogging stroller frame 10 from the erected use configuration 100 (as shown in FIG. 1) to the folded configuration 200 (as shown in FIG. 6), the swivel sleeve assemblies 7 shall then carry the rear sets 23 to swivel ninety degrees (90°) from a longitudinally traveling direction 20 to a transversally stowing direction 30 and vice versa.

By the association of the pair of connecting elements 6 between the pair of push arms 3 and the swivel sleeve assemblies 7, the rotation of the pair of push arms 3 drives the swivel sleeve assemblies 7.

Figure 3:
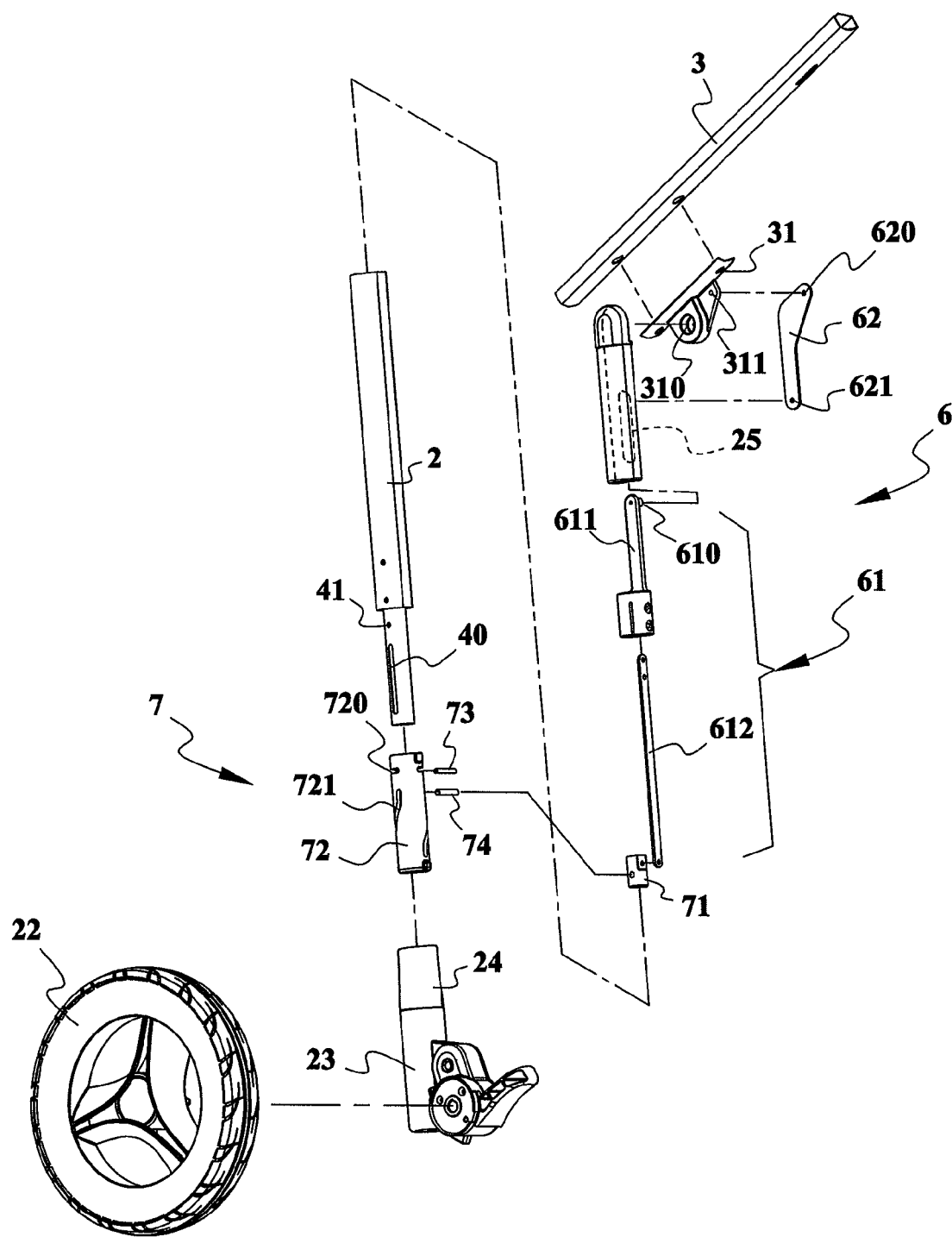
FIG. 3 is an exploded view of the auto-swiveling mechanism according to the present invention.
Figure 5:
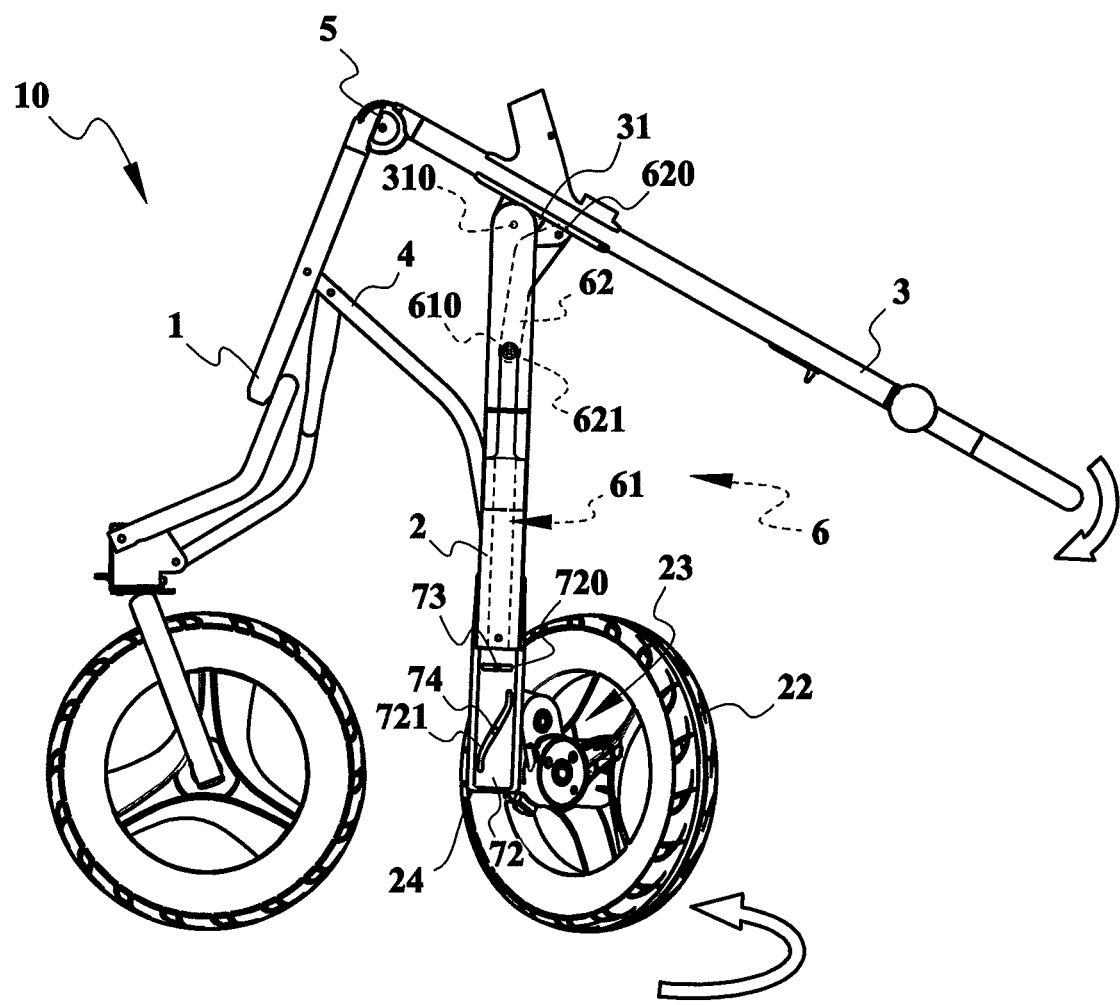
FIG. 5 is a schematic view for illustrating further operations of the auto-swiveling mechanism according to the present invention.

Referring to FIGS. 3 and 5, the rear struts 2 each may be formed with a long slot 40 and an aperture 41, and the swivel sleeve assemblies 7 comprising two sliders 71, two sleeves 72, two first pins 73 and two second pins 74.

In this embodiment, the two sliders 71 are movably received in the lower end of the rear struts 2 and connected with the connecting elements 6 respectively, and the two sleeves 72 are rotatably sleeved on the lower ends of the rear struts 2 and formed with a limiting groove 720 and a helical groove 721.

The two first pins 73 are inserted in and fixed to the apertures 41 at the lower end of the rear struts 2 each has one end slidably engaged in the limiting groove 720 for connecting the sleeves 72 to the rear struts 2 and limiting the swiveling of the sleeves 72 within a predetermined swivel range in ninety degrees (90°), namely between the longitudinally traveling direction 20 and the transversally stowing direction 30 and vice versa.

The two second pins 74 are fixedly mounted on the two sliders 71 each has at least one end extending outward and slidably engaged in the long slot 40 and the helical groove 721. As the pair of connecting elements 6 is associated between the pair of push arms 3 and the two sliders 71, when push arms 3 are rotated, the two sliders 71 shall move along the rear struts 2 either upward or downward, this shall cause the two second pins 74 to be pushed by the helical groove 721 to rotate and cause the two sleeves 72 between the longitudinally traveling direction 20 and the transversally stowing direction 30.

The pair of connecting elements 6 each includes a rigid connecting part 61 and a driving part 62. The rigid connecting part 61 is threaded through the rear struts 2 and formed with a lower end for connecting to the sliders 71, and an upper end 610 for connecting to the driving part 62. In one embodiment as shown in FIG. 3, the rigid connecting part 61 is composed of a first section 611 and a second section 612, the first section 611 is pivotably connected to the driving part 62, and the second section 612 is connected with the sliders 71.

The driving part 62 has an upper pivoting portion 620 pivotably connected to the pair of push arms 3 and a lower pivoting portion 621 pivotably connected to the upper end 610 of the rigid connecting part 61. Preferably, the pair of push arms 3 each may be equipped with a pivot mount 31 for pivoting with the driving part 62. The pivot mount 31 may also be formed with a first pivot portion 310 for pivotally connecting with one of the pair of rear struts 2, and a second pivot portion 311 for pivotally connecting with the driving part 62.

In one embodiment as shown in FIG. 3, the driving part 62 may be embodied as a metal plate formed with the upper pivoting portion 620 for pivotably connecting to the pair of push arms 3 and the lower pivoting portion 621 for pivotably connecting to the upper end 610 of the rigid connecting part 61.

Preferably, the upper end 610 of the rigid connecting part 61 may include a portion protruded through one of the pair of rear struts 2 for pivoting to the lower pivoting portion 621 of the driving part 62. In this embodiment, the pair of rear struts 2 each may be formed with a slot 25 at an upper end thereof, so as permitting the upper end 610 of the rigid connecting part 61 to protrude through the slot 25 for pivoting to the lower pivoting portion 621 of the driving part 62.

The pair of rear sets 23 each has a top portion 24 for non-rotatably connecting with one of the two sleeves 72, and rotatably mounts with a wheel 22 on one side thereof. In this embodiment, the top portion 24 of the rear sets 23 may be formed as a cup-liked portion to sleeve on the sleeves 72 and cover the peripheral of the limiting groove 720 and the helical groove 721 for achieving an aesthetic and dustproof purpose.

As being illustrated in FIGS. 4 and 5, when the lockable joints 5 is unlocked, the pair of push arms 3 shall take the pivot mount 31 as a fulcrum to rotated downward as a labor-saving lever, this shall carry the front strut 1 as well as the seat support rods 4 close to the rear struts 2. While the pair of push arms 3 is rotating, the association of the connecting elements 6 shall cause the sleeves 72 and the rear sets 23 to swivel ninety degrees from the longitudinally traveling direction 20 to a transversally stowing direction 30 thereby achieving a compact configuration for storage.

Due to the pair of push arms 3 can be operated in a labor-saving, user is easy to manipulate the folding and unfolding of the foldable jogging stroller frame 10 in a most convenient way. Besides, the structure of the swivel sleeve assemblies 7 is simplified to include only a few simple elements, that easy to assembly and cost-down in manufacturing the jogging stroller of the present invention.

While particular embodiments of the invention have been described, those skilled in the art will recognize that many modifications are possible that will achieve the same goals by substantially the same system, device or method, and where those systems, devices or methods still fall within the true spirit and scope of the invention disclosed.

What is claimed is:

1. A foldable jogging stroller frame with an auto-swiveling mechanism for rear wheel sets thereof, the foldable jogging stroller frame (10) including a front strut (1), a pair of push arms (3) pivoted with the front strut (1) by a pair of lockable joints (5), a pair of rear struts (2) pivoted to the pair of push arms (3), a seat support rods (4) pivoted between the front strut (1) and the rear struts (2), and the auto-swiveling mechanism including:
   two sets of swivel sleeve assemblies (7) operatively connected to the pair of rear struts (2);
   a pair of rear sets (23) connected to the swivel sleeve assemblies (7); and
   a pair of connecting elements (6) connected between the pair of push arms (3) and the swivel sleeve assemblies (7); wherein the foldable jogging stroller frame (10) can be converted from an erected use configuration (100) to a folded configuration (200) by unlocking the lockable joints (5) and rotating the pair of push arms (3), when the pair of push arms (3) are rotated from the erected use configuration (100) to a folded configuration (200), the swivel sleeve assemblies (7) carry the rear sets (23) to swivel ninety degrees (90°) from a longitudinally traveling direction (20) to a transversally stowing direction (30) and vice versa.

2. The foldable jogging stroller frame with an auto-swiveling mechanism for rear wheel sets thereof according to claim 1, wherein the rear struts (2) each is formed with a long slot (40) and an aperture (41), and the swivel sleeve assemblies (7) comprising:
   two sliders (71) movably received in the lower end of the rear struts (2) and connected with the connecting elements (6) respectively;

two sleeves (72) rotatably sleeved on the lower ends of the rear struts (2) each being formed with a limiting groove (720) and a helical groove (721);

two first pins (73) inserted in the apertures (41) at the lower end of the rear struts (2) each has one end slidably engaged in the limiting groove (720) for limiting a swivel range of the two sleeves (72) in ninety degrees (90°) namely between the longitudinally traveling direction (20) and the transversally stowing direction (30) and vice versa; and two second pins (74) mounted on the two sliders (71) each has at least one end slidably engaged in the long slot (40) and the helical groove (721); when the two sliders (71) are drove to moved along the rear struts (2), shall force the two second pins (74) to be pushed by the helical groove (721) to rotate thereby swiveling the two sleeves (72) between the longitudinally traveling direction (20) and the transversally stowing direction (30) and vice versa.

3. The foldable jogging stroller frame with an auto-swiveling mechanism for rear wheel sets thereof according to claim 1, wherein the pair of connecting elements (6) each including:

a rigid connecting part (61) threaded through the rear struts (2) and formed with a lower end and an upper end (610), the lower end connected to the sliders (71); and a driving part (62) having an upper pivoting portion (620) pivotably connected to the pair of push arms (3) and a lower pivoting portion (621) pivotably connected to the upper end (610) of the rigid connecting part (61).

4. The foldable jogging stroller frame with an auto-swiveling mechanism for rear wheel sets thereof according to claim 3, wherein the rigid connecting part (61) is composed of a first section (611) and a second section (612), the first section (611) is pivotably connected to the driving part (62), and the second section (612) is connected with the sliders (71).

5. The foldable jogging stroller frame with an auto-swiveling mechanism for rear wheel sets thereof according to claim 3, wherein the driving part (62) is a metal plate formed with the upper pivoting portion (620) for pivotably connecting to the pair of push arms (3) and the lower pivoting portion (621) for pivotably connecting to the upper end (610) of the rigid connecting part (61).

6. The foldable jogging stroller frame with an auto-swiveling mechanism for rear wheel sets thereof according to claim 3, wherein the upper end (610) of the rigid connecting part (61) includes a portion protruded through one of the pair of rear struts (2) for pivoting to the lower pivoting portion (621) of the driving part (62).

7. The foldable jogging stroller frame with an auto-swiveling mechanism for rear wheel sets thereof according to claim 3, wherein the pair of rear struts (2) each is formed with a slot (25) at an upper end thereof, and the upper end (610) of the rigid connecting part (61) is protruded through the slot (25) for pivoting to the lower pivoting portion (621) of the driving part (62).

8. The foldable jogging stroller frame with an auto-swiveling mechanism for rear wheel sets thereof according to claim 3, wherein the pair of push arms (3) each is provided with a pivot mount (31) for pivoting with the driving part (62).

9. The foldable jogging stroller frame with an auto-swiveling mechanism for rear wheel sets thereof according to claim 8, wherein the pivot mount (31) is formed with a first pivot portion (310) for pivotally connecting with one of the pair of rear struts (2), and a second pivot portion (311) for pivotally connecting with the driving part (62).

10. The foldable jogging stroller frame with an auto-swiveling mechanism for rear wheel sets thereof according to claim 2, wherein the pair of rear sets (23) each has a top portion (24) for non-rotatably connecting with one of the two sleeves (72), and rotatably mounts with a wheel (22) on one side thereof.

* * * * *